United States Patent [19]

Alpers et al.

[11] 4,278,976
[45] Jul. 14, 1981

[54] REMOTE SENSING DEVICE

[75] Inventors: Frederick C. Alpers, Riverside, Calif.; Klaus J. Hecker, Oberursel, Fed. Rep. of Germany

[73] Assignee: The United States of America as represented by the Secretary of the Navy, Washington, D.C.

[21] Appl. No.: 690,708

[22] Filed: Dec. 7, 1967

[51] Int. Cl.³ .............................................. G01S 13/74
[52] U.S. Cl. ............................ 343/6.5 R; 343/5 PC; 343/6 R; 343/6 A
[58] Field of Search ................... 343/6, 6 A, 6.5, 6 R, 343/6.5 R, 6.5 LC, 5 PC

[56] References Cited

U.S. PATENT DOCUMENTS 3,063,048   11/1962   Lehan et al. ..................... 343/6.5 X Primary Examiner—Malcolm F. Hubler
Attorney, Agent, or Firm—Richard S. Sciascia; Joseph M. St.Amand; T. M. Phillips

[57] ABSTRACT

A system for battlefield and enemy support area surveillance. An air-dropped unit monitors and records on tape enemy activity, and plays back and transmits the monitored data at high speed when interrogated by a coded signal from friendly aircraft.

3 Claims, 4 Drawing Figures

REMOTE SENSING DEVICE

The invention herein described may be manufactured and used by or for the Government of the United States of America for governmental purposes without the payment of any royalties thereon or therefor.

BACKGROUND OF THE INVENTION

The present invention relates to data gathering, transmitting, and recovering information from the transmitted data, and more particularly to a remote sensing device which may be dropped behind enemy lines and then interrogated by a friendly aircraft. The function accomplished by the present invention has heretofore been accomplished by sending spies or patrols into enemy territory.

SUMMARY

The present invention provides a means of recording and transmitting information from behind enemy lines without disclosing the recorded information to the enemy. A recorder/transmitter is dropped behind the enemy lines and upon interrogation from a friendly aircraft, information recorded is transmitted to the friendly aircraft and it may be re-recorded or re-transmitted to an evaluation station where it is recorded. The recorded data is analyzed and evaluated to provide useful information.

Many of the attendant advantages of this invention will become readily appreciated as the same becomes better understood by reference to the following detailed description when considered in connection with the accompanying drawings wherein.

Figure 2:
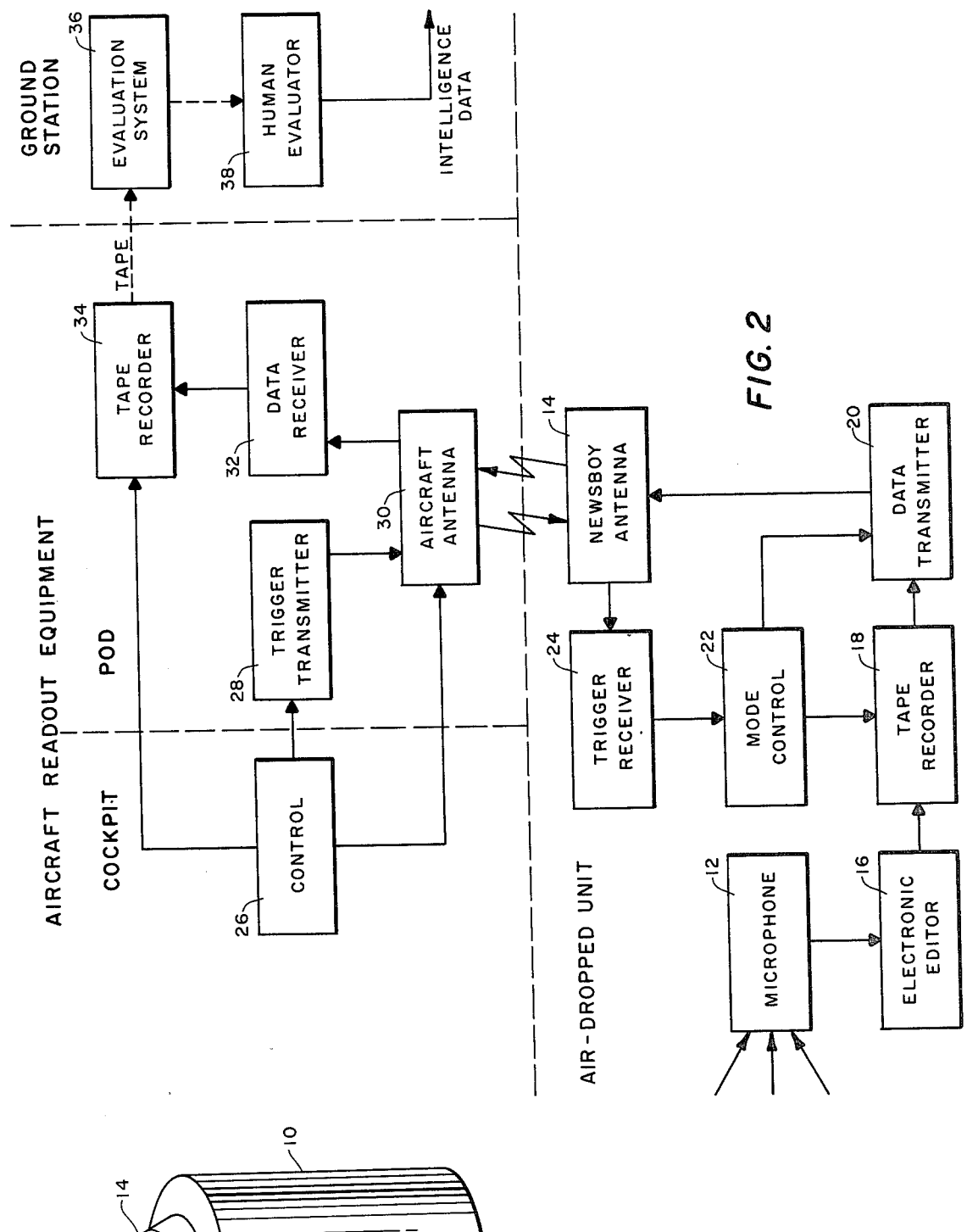
FIG. 2 is a block diagram of the invention.
Figure 1:
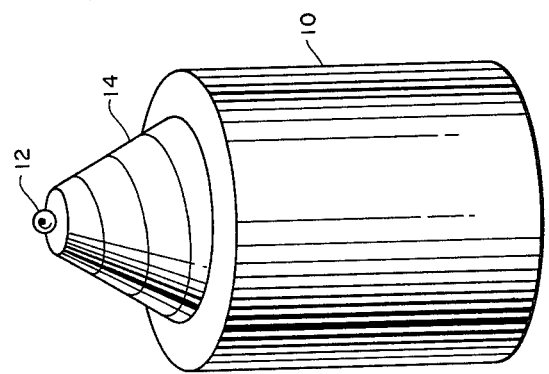
FIG. 1 shows a perspective view of a packaged configuration of the recording and transmitting portion of the invention.

Referring to the drawings there is shown in FIG. 1 a container 10 for housing a tape recorder and transmitting apparatus. An omni-directional microphone 12 is positioned so that sound from any direction can be received. A spiral antenna 14 is mounted on a tapered upper portion of container 10. As shown in FIG. 2, sound picked up by microphone 12 is fed to electronic editor 16 to produce an output signal that traces out the envelope of the spectrum of the input audio signal as the editor frequency is modulated at a relatively slow rate and will be described more fully below. The output signal from editor 16 is recorded on tape by tape recorder 18 and will play back and provide an input to data transmitter 20 in response to a control signal from mode control 22. Mode control 22 operates in response to a trigger signal received from trigger receiver 24 which is initiated from the pilot control 26 of the interrogating aircraft. The trigger signal is generated and transmitted by transmitter 28 and aircraft antenna 30. Antenna 14 receives the trigger signals and transmits the data signals while antenna 30 transmits the trigger signals and receives the data signals. Received data signals are processed by data receiver 32 and are fed to tape recorder 34. Data recorded by tape recorder 34 is flown to a ground station (or may be radio transmitted) where it is evaluated in the evaluation system 36 and a human evaluator 38 to produce intelligence.

Figure 3:
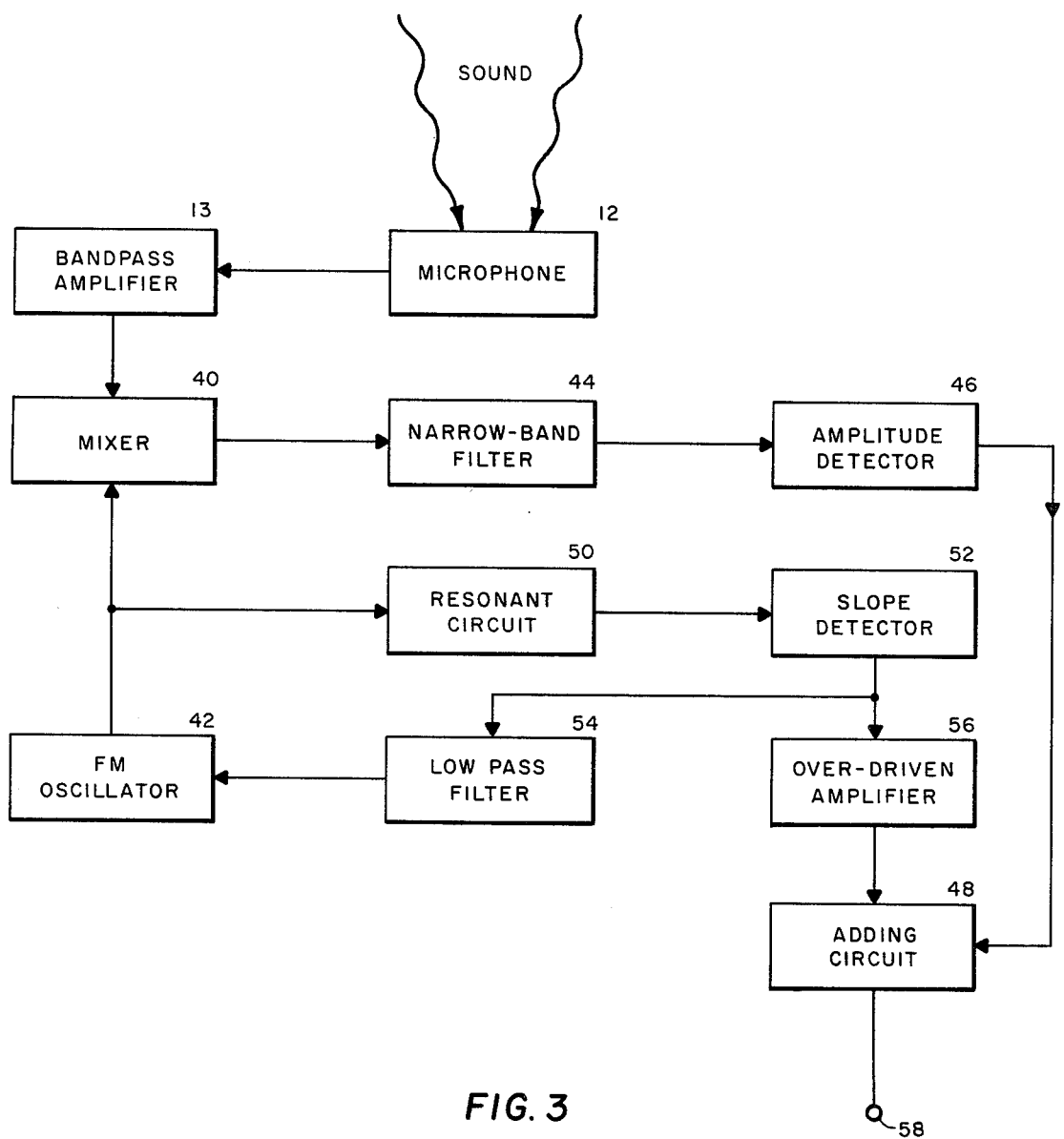
FIG. 3 is a block diagram of the electronic editor of FIG. 2.

Referring to FIG. 3 there is shown in more detail electronic editor 16. Sounds picked up by microphone 12 located on top of container 10 (FIG. 1) are amplified in bandpass amplifier 13 to eliminate background noise and is then fed to mixer 40 of editor 16. The signal fed into mixer 40 is mixed with a frequency modulated signal from frequency-modulated oscillator 42 and then passed through a narrow-band filter 44 and amplitude detector 46 to adding circuit 48. Frequency modulated oscillator 42 is controlled in frequency by means of resonant circuit 50, slope detector 52 and low-pass filter 54. The output of low-pass filter 54 indicates when the frequency of FM oscillator 42 reaches its lower frequency limit and slope detector 52 introduces synchronizing signals to the output of overdriven amplifier 56. Adding circuit 48 combines the spectral-component signal from amplitude detector 46 with the synchronizing pulses from overdriven amplifier 56 to provide an output signal at terminal 58 for recording.

Figure 4:
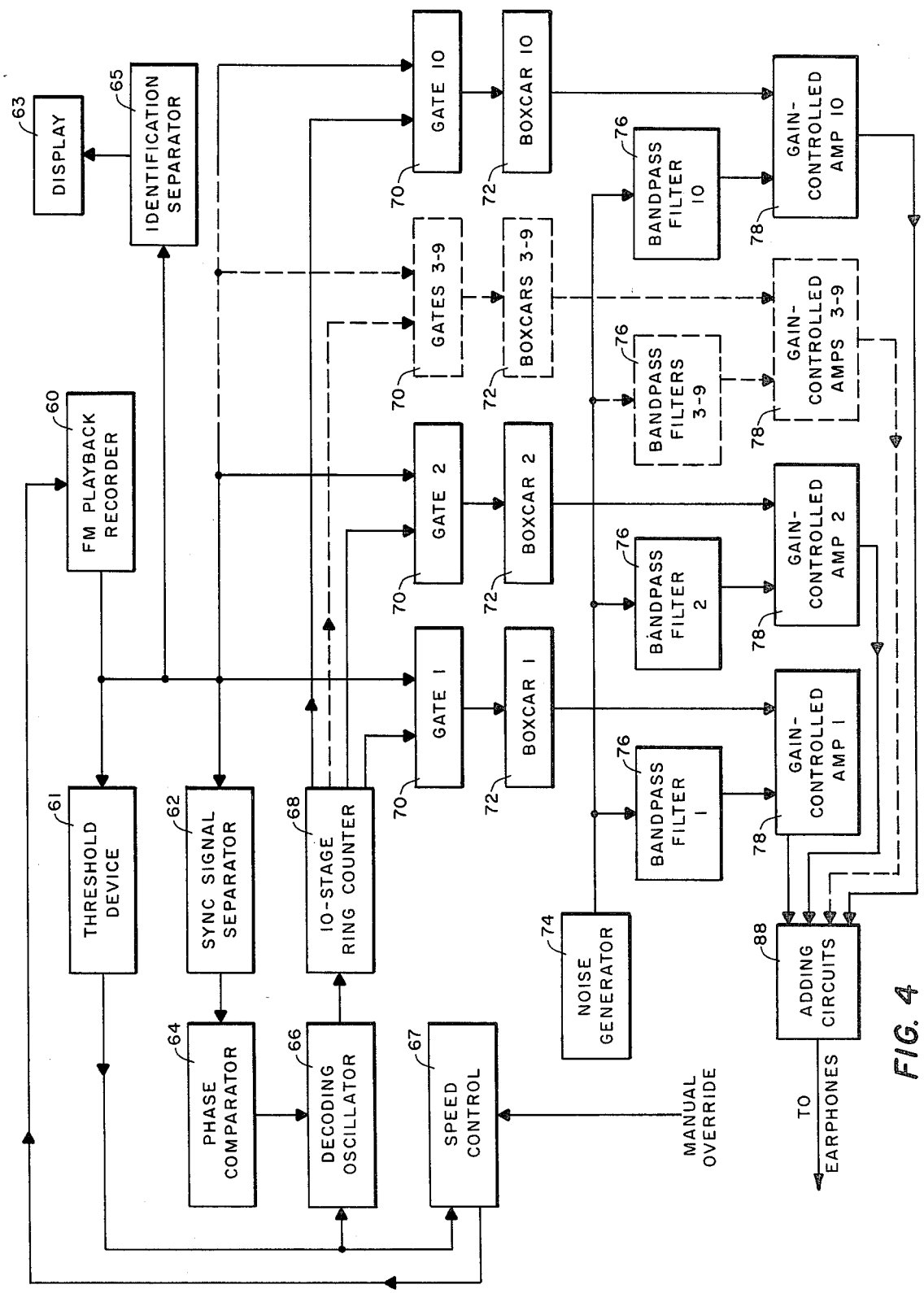
FIG. 4 is a block diagram of the evaluation portion of the invention.

As shown in FIG. 4, the signal reproduced by FM playback recorder 60 is fed to synchronization signal separator 62. The output sync signal is fed to phase comparator 64 to control the frequency of decoding oscillator 66 which should operate at ten times the sync pulse frequency. Since this frequency changes with the speed of the tape, the frequency of oscillator 66 should be switched together with the tape speed by regulating speed control 67 and the frequency with the same signal from threshold circuit 61. The output from playback recorder 60 is also fed to an appropriate display 63 through an identification circuit 65. The output of decoding oscillator 66 is fed to a ten stage ring counter 68. For each sync pulse received ring counter 68 will go through a complete counting sequence. Since a signal at a particular position with respect to the sync pulses corresponds to a particular frequency band, excitation of a particular ring counter stage will be in synchronization with the reception of signals corresponding to specific frequency ranges.

The outputs of ring counter 68 are fed to gate circuits 70 which receive the tape signal inputs from playback recorder 60. The output of each individual gate circuit is a train of pulses whose amplitude corresponds to consecutive samples of the signal strength in a particular portion of the recorded audio spectrum. These signals are stretched in boxcar circuits 72, resulting in continuous signals which are equivalent to the signals in the different channels of a conventional vocoder. The original audio signal (a close approximation) can be recovered by controlling the amplitudes of spectral portions of an artificial audio signal with the boxcar output signals. To achieve this, a noise signal is generated by noise generator 74 and filtered by spectral filters 76. Each filter passes a portion of the noise spectrum corresponding to the different portions which result from the sweep action of the frequency modulated oscillator 42 (FIG. 3). The spectral component signals are then fed to amplifiers 78 whose gains are controlled by the outputs of the boxcar circuits 72. The output signals from amplifiers 78 are added in a conventional manner by adding circuits 88 to produce the approximation of the original audio signal, which may be fed to earphones for evaluation.

In operation, before the data transfer sequence can begin, the pilot navigates his aircraft to a predetermined position in the vicinity of the device and initiates the trigger control 26. A trigger signal is then transmitted by the trigger transmitter 28 via the aircraft antenna 30 and is received in the recording trigger receiver 24 via antenna 14. The triggering action causes tape recorder 18 to start play-back. It also causes playback transmitter 20 to be energized so that it will transmit the recorded information. In the aircraft, the information received is re-recorded on aircraft recorder 34.

Obviously many modifications and variations of the present invention are possible in the light of the above teachings. It is therefore to be understood that within the scope of the appended claims the invention may be practiced otherwise than as specifically described.

What is claimed is:

1. In a system for battlefield and enemy support area surveillance, the combination comprising:
    (a) sound recording and radio transmitting means adapted to be air dropped behind enemy lines in a battlefield area including:
        (1) a microphone for converting sound waves into electronic signals,
        (2) electronic editor means coupled to said microphone for compressing said electronic signals into a bandwidth suitable for recording and playback transmission,
        (3) tape recorder means coupled to said electronic editor for recording and playing back the compressed signals from said electronic editor means,
        (4) mode control means,
        (5) transmitter means coupled to said tape recorder and to said mode control means for transmitting signals received from said tape recorder when operating in the playback mode,
    (b) radio signal receiving and recording means adapted to be located in an interrogating aircraft for receiving and recording signals received from said sound recording and radio transmitting means,
    (c) a radio link coupling said sound recording and radio transmitting means to said radio signal receiving and recording means,
    (d) a sound reconstruction system for receiving the recorded radio frequency signals for generating output audio signals which are a close approximation of the originally recorded audio signals.

2. The system of claim 1 wherein said electronic editor means comprises:
    (a) mixer circuit means having a first input coupled to the output of said microphone and having a second input and an output,
    (b) a frequency modulated oscillator having an output coupled to the second output of said mixer circuit means,
    (c) a narrow band filter circuit having an input coupled to the output of said mixer circuit means and having an output,
    (d) an amplitude detector having an input coupled to the output of said narrow band filter and having an output,
    (e) a resonant circuit having an input coupled to the output of said frequency modulated oscillator and having an output,
    (f) slope detector means having an input coupled to the output of said resonant circuit and having an output for providing a slowly varying voltage,
    (g) low pass filter means having an input coupled to the output of said slope detector means and having an output coupled to the input of said frequency modulated oscillator for providing a modulating voltage,
    (h) over driven amplifier means having an input coupled to the output of said slope detector for providing a periodic output signal and having an output,
    (i) adding circuit means having a first input coupled to the output of said amplitude detector and a second input coupled to the output of said over driven amplifier for providing an output signal that traces out the envelope of the spectrum of the input audio signal with a synchronized pulse.

3. The system of claim 1 wherein said sound reconstruction system comprises:
    (a) playback recorder means for playing back recordings to reproduce the recorded signals for processing,
    (b) synchronous signal separator means coupled to said playback recorder means for passing sync-signals and having an output,
    (c) phase comparator means having an input coupled to said synchronous signal separator means and having an output,
    (d) decoding oscillator means coupled to said phase comparator and to said playback recording means for producing an output signal ten times the sync pulse frequency,
    (e) a ten stage ring counter coupled to said decoding oscillator for producing a complete counting sequence in response to each sync pulse received,
    (f) a plurality of gate circuits a first input coupled to and corresponding to each of the ten stages of said ten stage ring counter and each having a second input coupled to the output of said playback recording means,
    (g) a boxcar circuit coupled to each of said gate circuits for stretching the output pulses from said gate circuits to produce continuous signals whose amplitude corresponds to samples of the signal strength in a particular portion of the audio spectrum passed by the gate to which it is coupled,
    (h) noise generator means for generating audio noise signals,
    (i) a plurality of bandpass filters coupled to the output of said noise generator,
    (j) a plurality of gain controlled amplifiers corresponding to the number of gate circuits and each having a first input coupled to a bandpass filter and a second input coupled to a boxcar circuit whereby a plurality of signals will be produced corresponding to a spectrum of signals originally recorded,
    (k) adding circuit means coupled to said plurality of gain controlled amplifiers for combining the plurality of signals into one signal which is a close approximation of the originally recorded signal.

* * * * *